United States Patent [19]

Kimura

[11] Patent Number: 5,469,223
[45] Date of Patent: Nov. 21, 1995

[54] SHARED LINE BUFFER ARCHITECTURE FOR A VIDEO PROCESSING CIRCUIT

[75] Inventor: Scott A. Kimura, Saratoga, Calif.

[73] Assignee: AuraVision Corporation, Fremont, Calif.

[21] Appl. No.: 206,491

[22] Filed: Mar. 4, 1994

Related U.S. Application Data

[63] Continuation-in-part of Ser. No. 136,621, Oct. 13, 1993.

[51] Int. Cl.⁶ .................................................. H04N 7/24
[52] U.S. Cl. ..................... 348/581; 348/448; 348/552; 348/568
[58] Field of Search .................................... 348/628, 448, 348/392, 424, 552, 581, 568; H04N 7/13

[56] References Cited

U.S. PATENT DOCUMENTS

| | | | |
|---|---|---|---|
| 4,897,855 | 1/1990 | Acampora | 348/419 |
| 4,941,045 | 7/1990 | Birch | 348/448 |
| 5,008,752 | 4/1991 | Van Nostrand | 348/581 |
| 5,307,164 | 4/1994 | Dong-Il | 348/448 |
| 5,363,140 | 11/1994 | Isomoto | 348/628 |

*Primary Examiner*—Howard W. Britton
*Attorney, Agent, or Firm*—Skjerven, Morrill, MacPherson, Franklin & Friel; Brian D. Ogonowsky

[57] ABSTRACT

A single line buffer in a motion video card is used for both vertical reduction of the pixel image before storage in a video memory buffer and vertical expansion of the pixel image after being outputted by the video memory buffer. When the desired display size is smaller than the original pixel image size, then the line buffer is used by the input pipeline to reduce the image. When the desired display size is larger than the original pixel image size (or larger than the image stored in the memory buffer), then the line buffer is used by the output pipeline to enlarge the image.

9 Claims, 3 Drawing Sheets

SHARED LINE BUFFER ARCHITECTURE FOR A VIDEO PROCESSING CIRCUIT

CROSS-REFERENCE TO RELATED APPLICATIONS

This application is a continuation-in-part of U.S. application Ser. No. 08/136,621, filed Oct. 13, 1993, entitled "Data Processing Technique for Limiting the Bandwidth of Data to be Stored in a Buffer," assigned to the present assignee and incorporated herein by reference.

FIELD OF THE INVENTION

This invention relates to a raster scan type video processing circuit and, in particular, to reducing the cost and area required for line buffers in a video processing circuit.

BACKGROUND OF THE INVENTION

In a typical multi-media system, a conventional personal computer is augmented with a full-motion video card to display full-motion video in a window on its display screen along with still images, such as text, outside the video window. Such a system offers enormous potential for educational applications and other interactive applications.

FIG. 1 generally illustrates a conventional personal computer display portion 10 on the right side of FIG. 1 and the pertinent components of a full-motion video card 12 on the left side of FIG. 1. This video card 12 is typically an add-on card which is inserted into the motherboard of the personal computer for augmenting its video processing capabilities.

The personal computer includes a raster-scan type display monitor 13 which may have on the order of 800×600 pixels or more. A conventional VGA frame buffer 14 is generally bit-mapped to the display monitor 13 so that the storage locations in the frame buffer 14 have a one-to-one correspondence with the pixels in the display monitor 13.

The motion video card 12 receives raster scan analog or digital motion video information from a VCR, laser disk, CD ROM, television, or any other video source. This information is then converted into the proper digital format, filtered, and applied to a vertical and horizontal scaler 15. The vertical and horizontal scaler 15 is controlled by signals on a control line 16 to reduce (if desired) the effective size (width×height) of the incoming video image so that the motion video image can be displayed in a small window 17 on the display monitor 13. The original image (e.g., 640×480 pixels) is scaled down by dropping lines of pixels to reduce the vertical height and by dropping pixels along a horizontal line to reduce the horizontal width of the video image. For example, if the original video image were to be scaled down 50%, alternate lines of the video image would be deleted and alternate pixels would be deleted, thus reducing both the vertical and horizontal size by one half. Such horizontal scaling by 50% effectively reduces the peak bandwidth of the video signal by about half since every other video pixel is dropped.

To smooth abrupt contrast transitions which may be caused by the dropping of pixels (when horizontally scaling) or the dropping of entire lines of pixels (when vertically scaling), a low pass filter 20 is provided to effectively blur high frequency pixel transitions to a controlled degree. Given a raster stream of pixel data, it is easy to filter pixels adjacent to each other on a horizontal line because they appear in the raster stream back to back. However it is difficult to do filtering of pixels which are adjacent vertically. This is because the pixels are separated by an entire line of other pixels in the raster stream. The designer has two options for accessing previously scanned pixels. Either the previous line of pixel data can be read from the motion video memory buffer 22, which undesirably increases the bandwidth requirements of the memory buffer 22, or the pixel data for one line can be stored locally. The latter solution requires a line buffer 24.

The scaled and filtered video data outputted by scaler 15 is then temporarily stored in a motion video memory buffer 22, which may be a VRAM or DRAM.

A horizontal and vertical expander/interpolator 25 may be connected at the output of the memory buffer 22 to increase the pixel size of the video image beyond the pixel size of the image stored in memory buffer 22. As described with respect to filter 20 and line buffer 24, vertical filtering or vertical interpolation requires knowledge about pixels in an adjacent line of pixels. Hence, temporary storage of a previous line of pixels outputted by memory buffer 22 must be provided by a line buffer 27 connected to the expander/interpolator 25. Providing two line buffers 24 and 27 adds expense to the video circuitry and takes up valuable die area when the video circuitry is formed as an integrated circuit.

The video data from the frame buffer 14 and the full-motion video data outputted from the expander/interpolator 25 are then multiplexed by multiplexer 26 so that the full-motion video data is inserted at the proper time into the video data stream for display by the display monitor 13.

This resulting multiplexed video data stream is converted to analog by the D/A converter 28 and then applied to the display monitor 13 to display a full-motion video window 17 along with other data on the display monitor 13. Since the incoming video image was scaled down by half in each dimension, to 320×240 pixels, a full-motion video window 17 of 320×240 pixels is now present on the display monitor 13.

What is needed is a less expensive and more area efficient motion video circuit.

SUMMARY

A single line buffer in a motion video card is used for both vertical reduction of the pixel image before storage in a video memory buffer and vertical expansion of the pixel image after being outputted by the video memory buffer. When the desired display size is smaller than the original pixel image size, then the line buffer is used by the input pipeline to reduce the image. When the desired display size is larger than the original pixel image size (or larger than the image stored in the memory buffer), then the line buffer is used by the output pipeline to enlarge the image. In rare situations when one desires to both vertically reduce/vertically filter the image to be stored in the motion video memory buffer and vertically enlarge it again when it is read out, the user must decide which pipeline uses the line buffer.

BRIEF DESCRIPTION OF THE DRAWINGS

FIGS. 2, 2a and 2b show a block diagram illustrating one embodiment of the invention using a multiplexed line buffer for either vertical reduction or vertical expansion.

DETAILED DESCRIPTION OF THE PREFERRED EMBODIMENT

Figure 1:
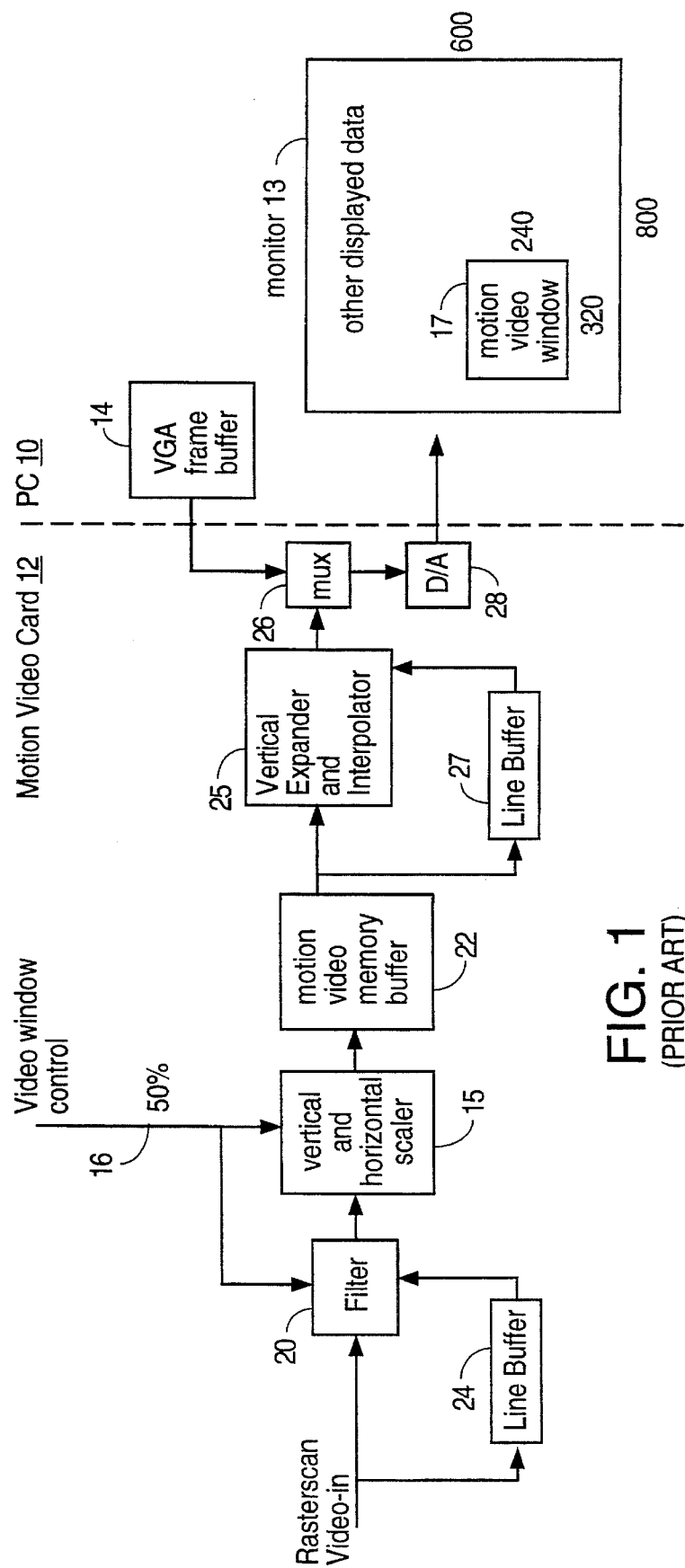
FIG. 1 is a block diagram of a conventional multimedia system using a conventional personal computer and a full-motion video card.
Figure 2A:
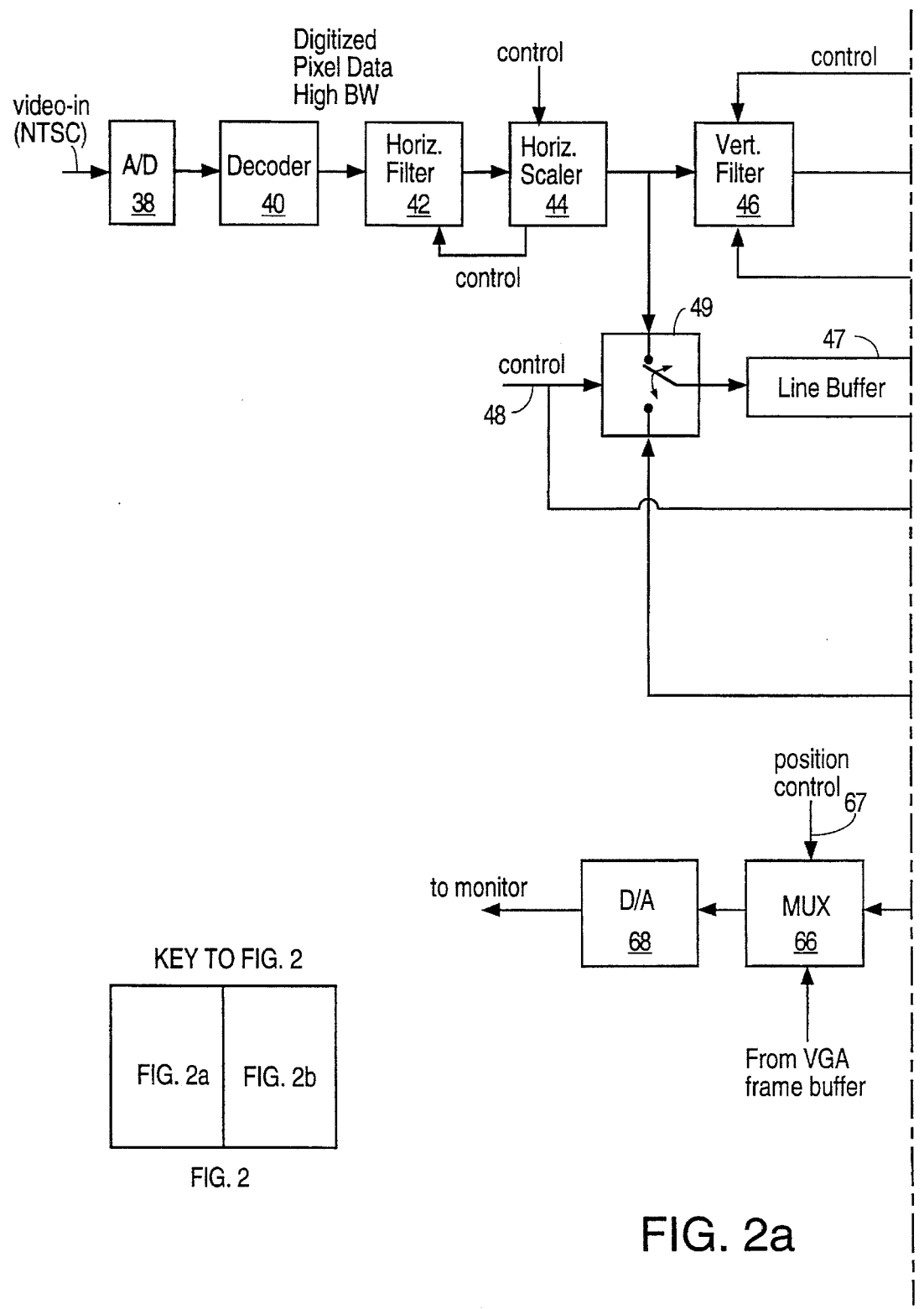
Figure 2B:
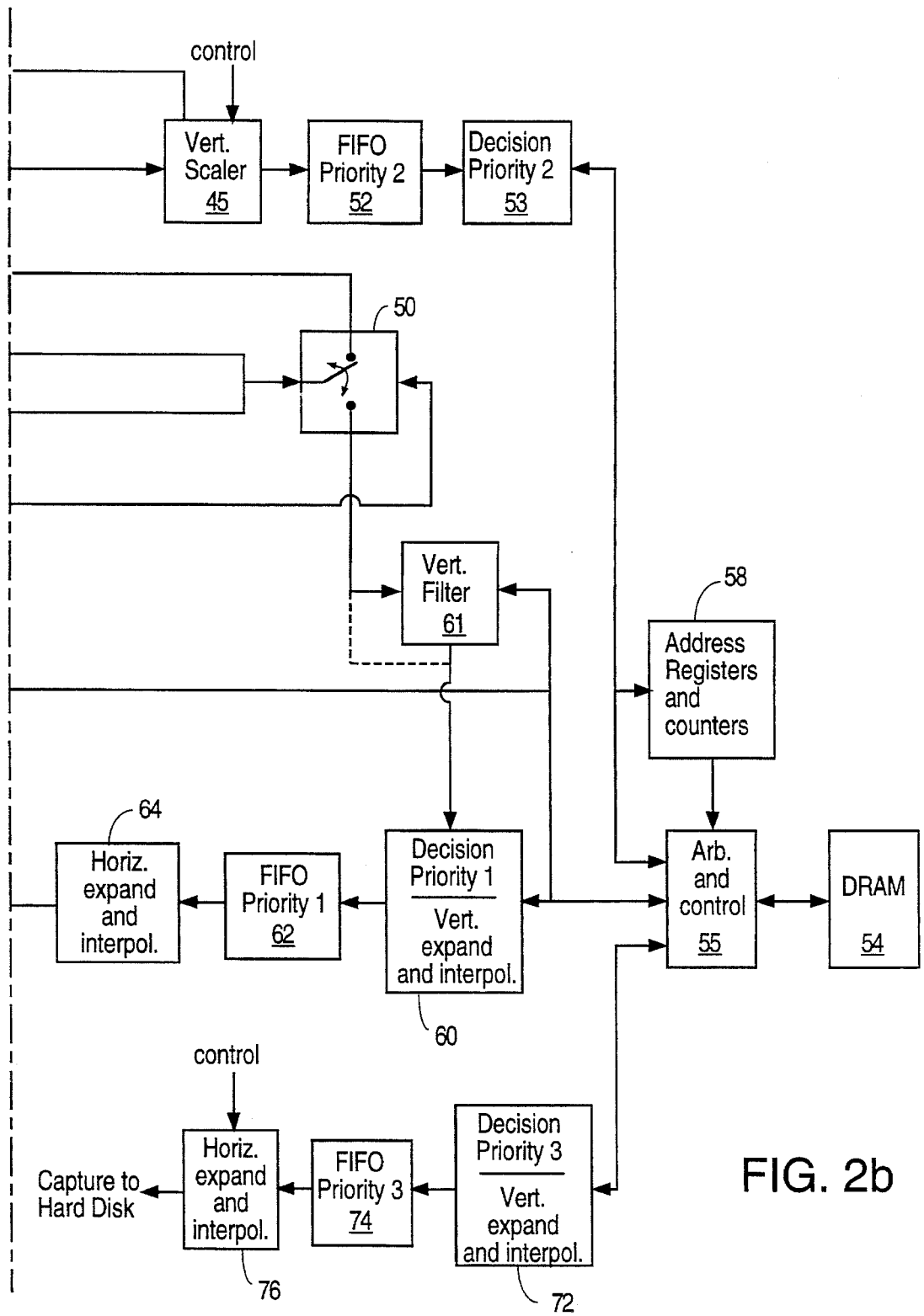

FIGS. 2a and 2b show a block diagram illustrating the preferred embodiment video processing system for processing full-motion video data for a multi-media application. Each of the functional blocks of FIGS. 2a and 2b is either a conventional circuit or a circuit/software program which could be implemented by one skilled in the art using conventional techniques after reading this disclosure.

The structure of FIGS. 2a and 2b is used in conjunction with a conventional personal computer to process, buffer, and display full-motion video data originating from a VCR, laser disk, CD ROM, television, or other video source. This video source may generate full-motion video information in a National Television System Committee (NTSC) format or other format. As will be explained, the digitized and processed full-motion video data may be multiplexed with pixel data outputted by the computer's conventional frame buffer to simultaneously display both the conventional application software data and a window of full-motion video data. The structure of FIGS. 2a and 2b may be contained on a single video card for insertion into a slot on the motherboard of a personal computer. This video card interacts with the existing VGA graphics card in the personal computer as will be further described below. In the preferred embodiment, all functional blocks shown in FIGS. 2a and 2b except blocks 40, 54, and 68, are implemented as a single integrated circuit.

The analog NTSC signal generated externally by a video source is converted to a digital signal by A/D converter 38 and then applied to a well-known type of decoder 40, such as a Phillips decoder part number 9051, which places the digitized signal in a selected standard format (e.g., a YUV or RGB pixel format). The selected format is dependent upon the particular display system used by the personal computer.

This now digitized full-motion video data is outputted by decoder 40 at a very high bit rate and therefore at a high bandwidth.

A controllable horizontal filter 42 effectively acts as a low pass filter to blur high frequency pixel image transitions. The output of filter 42 is connected to a horizontal scaler 44. Horizontal scaler 44 is controlled to periodically drop incoming pixel bits so as to effectively reduce the horizontal width of the video image and consequently reduce the bandwidth of the video data. For example, if horizontal scaler 44 were controlled to scale down the horizontal width of the image by 50%, then every other pixel would be dropped from the incoming video data. This assumes that the display is a conventional raster-scan type and the pixel data is used to energize pixels from left to right along the horizontal lines of the display.

The amount of filtering performed by filter 42 is related to the amount of scaling to be performed by horizontal scaler 44, wherein additional filtering of the incoming video signal is needed as the horizontal scaler 44 is controlled to progressively scale down the horizontal width of the video image.

The horizontal scaler 44 may be a separate circuit or may be part of a circuit which performs a variety of functions, including scaling. The horizontal scaler 44 may also be any compressor suitable for the particular type of data being transmitted.

Scaling down of the video image by dropping pixel bits causes the bandwidth of the video image data to proportionally decrease since the rate of pixel data exiting from horizontal scaler 44 is less than the rate of pixel data entering horizontal scaler 44. The horizontal scaling also reduces the required size of the full-motion video buffer 54.

If a horizontally scaled down image were now displayed, objects would appear narrower then normal. This narrowing of the image may be corrected by horizontally zooming (or expanding) the image data after retrieval from the video buffer.

If horizontal zooming were not used to offset the horizontal scaling of the video data, the width and height proportions of the original object images may be preserved by properly controlling vertical scaler 45. Vertical scaler 45 is used to periodically delete lines of pixels, using conventional techniques, to reduce the height of the resulting raster-scan image to be stored in the video buffer 54. Although vertical scaling reduces the height, or number of lines, of the pixel image, this vertical scaling does not limit the bandwidth of the video signal since vertical scaling does not affect the peak pixel data rate. Vertical scaling does, however, reduce the number of bits to be stored per frame in the full-motion video buffer 54, thus reducing the required size of the buffer 54.

Well known low pass filtering performed by vertical filter 46 may be used to ameliorate any undesirable visual effects, such as signal aliasing, resulting from dropping lines of pixels by the vertical scaler 45. In order to perform vertical filtering, pixels of two or more adjacent lines of pixels must be concurrently detected in order for the vertical filter 46 to filter any high frequency transitions between adjacent pixels aligned vertically.

A line buffer 47 is used to provide a temporary memory for a previous line of pixels to enable the vertical filter 46 to detect both a current pixel and a prior pixel in adjacent lines of pixels. In the prior art, it is conventional to provide one line buffer in the input pipeline for vertical reduction/filtering of the pixel image and provide a separate line buffer in the output pipeline for vertical expansion of the pixel image. The preferred embodiment of FIGS. 2a and 2b only requires the use of one line buffer 47 for both the input pipeline and the output pipeline, wherein the line buffer 47 is used by either the input pipeline or the output pipeline. It is only in rare situations that a user desires to vertically reduce the image for storage in the video memory buffer 54 and also vertically expand the image after being read out from the buffer 54. This is because the full motion video image to be displayed on a monitor is usually displayed in a small window, requiring only vertical reduction. Additionally, buffer 54 is usually made large enough to store a video image which has been only horizontally scaled to both reduce the image size and reduce the bandwidth requirements of the buffer 54. Accordingly, the line buffer 47 may be multiplexed without significantly reducing the capability of the video processing circuitry.

When the video processing circuit of FIGS. 2a 2b requires vertical reduction and filtering of the image prior to storage in buffer 54, a control signal is provided on line 48 to control switch 49 to connect an input of line buffer 47 to the output of horizontal scaler 44. The control signal also controls switch 50 to connect the output of line buffer 47 to an input of vertical filter 46. Hence, a line of pixel data will be stored in line buffer 47 as this line of pixel data is outputted from horizontal scaler 44. After this complete line of pixel data has been inputted into line buffer 47, this line of pixel data is then outputted from line buffer 47 one pixel at a time (in a first in-first out fashion) into vertical filter 46 at the same time that pixels from a next line are being applied to vertical filter 46, such that vertically adjacent pixels from two adjacent lines are being concurrently provided to the inputs of vertical filter 46 for filtering. During the time that the horizontal scaler 44 is outputting this new line of pixels into vertical filter 46, the pixels in this new line of pixels are also being stored in line buffer 47.

Line buffer 47 may be a shift register or other suitable sequential type memory conventionally used for line buffers. Switches 49 and 50 may be any suitable transistor switch or other type switch. Conventional low-pass filtering is performed by the vertical filter 46 on the two vertically adjacent pixels being applied to the inputs of vertical filter 46. Timing for the line buffer 47 is synchronous with the timing of the horizontal scaler 44. Such timing (e.g., horizontal synchronization, pixel clock) may be derived from the video-in signal itself, as is well known.

The vertically filtered pixel data is then outputted from vertical filter 46 into vertical scaler 45 for periodically deleting lines of the filtered pixels.

The control signal on line 48 for controlling switches 49 and 50 is generated automatically depending upon a required vertical size of the image to be stored in buffer 54. The vertical size of a full-motion video window on a display screen may be programmed by the user using the Windows™ program by Microsoft. The program, in conjunction with conventional logic circuitry, would then control the various scalers, expanders, and filters, as appropriate, to achieve the desired display window size.

The pixel data exiting from vertical scaler 45 is applied to a first in-first out (FIFO) buffer 52 for temporary storage. Well known packing and synchronization circuitry are used to interface the clocking of the incoming video data with the local clocking of FIFO buffer 52. This FIFO buffer 52 and synchronization circuitry is described in detail in the copending U.S. application Ser. No. 08/127,219, entitled "Flexible Multiport Multiformat Burst Buffer," incorporated herein by reference and assigned to the present assignee. In the preferred embodiment, this FIFO buffer 52 forms only a portion of a cache memory.

A decision circuit 53 determines the amount of space available in FIFO buffer 52 for receiving additional video data. The decision circuit 53 also requests access to a memory buffer 54, acting as a full-motion video buffer, to download data in the FIFO buffer 52 to prevent FIFO buffer 52 from overflowing. An arbitration and control circuit 55 determines whether the request for access should be granted, depending on the availability of the buffer 54. Such a decision circuit and arbitration circuit are well known and will not be discussed in detail. Additional detail regarding a preferred decision circuit and arbitration circuit is discussed in a copending application Ser. No. 08/127,219, incorporated herein by reference. Decision circuit 53 is designated priority 2, which means that a priority 1 decision circuit will override any request by decision circuit 53 for access to buffer 54.

The control portion of circuit 55 provides addressing and timing signals to the buffer 54 to store and retrieve video data in/from selected addresses of the buffer 54. Address registers located in block 58 are initially loaded with the horizontal and vertical starting address of the video data to be stored in the buffer 54 and the width and height of the video data block to be stored in the buffer 54. Counters in block 58, starting and stopping at the predetermined addresses, are then used to sequentially address the various rows and columns in the buffer 54 for storing the video data in a bit-mapped format. Such sequential addressing of rows and columns in a memory for storing video data is well known and will not be discussed herein in further detail.

The data path to the display monitor for displaying the stored video data will now be discussed.

A priority 1 decision circuit 60 is connected to the arbitration and control circuit 55 for requesting access to buffer 54 when decision circuit 60 determines that FIFO buffer 62 must be refilled in order to maintain a flow of pixel data to the display. Once the request is granted, a burst of video data is outputted from buffer 54 into FIFO buffer 62. The decision circuit 60 also includes sequential addressing circuitry which identifies the addresses in buffer 54 which are to be accessed. The addressing means used to address this information in buffer 54 for display is similar to the sequential addressing circuitry used to generate addresses for storing information in buffer 54. Such addressing circuitry is conventional and will not be discussed in detail herein.

The priority 1 decision circuit's 60 request for access to buffer 54 takes precedence over any request for access by the decision circuit 53 since the uninterrupted display of data takes priority over updating the buffer 54 with new video data.

Decision circuit 60 also provides a vertical zoom or expander capability by accessing the same line of pixels two or more consecutive times in order to increase the height of the displayed image to be that selected by the user. The vertical expander may also insert interpolated lines of pixels to increase the vertical height of the image.

If vertical expanding is required by the user to display a larger pixel image on a monitor than is stored in buffer 54, vertical filtering performed by vertical filter 61 may be appropriate to reduce any undesirable effects caused by the vertical expansion. For example, instead of duplicating adjacent lines of pixels, the duplicate line may be an interpolated line of pixels inserted between two original lines of pixels stored in buffer 54. This interpolated line of pixels may be an average taken between two adjacent lines of pixels stored in buffer 54. Such an averaged line of pixels to be inserted between two original lines of pixels may be performed by filtering vertically adjacent pixels in two consecutive lines of pixels stored in buffer 54 and then outputting this filtered line of pixels between the two original lines of pixels. Alternatively, the vertical filter 61 may be deleted and the stored line of pixels in line buffer 47 may be used by an interpolator circuit within block 60 to detect vertically adjacent pixels and output one or more interpolated lines of pixels rather than simply an average between two adjacent lines of pixels.

Thus, when an image is to be vertically enlarged, line buffer 47 is required to temporarily store pixel data from one line of pixels as the next line of pixels is being outputted from the arbitration and control circuit 55.

When line buffer 47 is required for use by block 60 or vertical filter 61, a signal on control line 48 causes switches 49 and 50 to switch the input of line buffer 47 to the output of the arbitration and control circuit 55 and to switch the output of the line buffer 47 to either the vertical filter 61 or directly to the input of the vertical expander and interpolator circuit 60, depending upon whether vertical filtering is needed.

Thus, line buffer 47 need not be duplicated for both the input pipeline and output pipeline but may be shared by both the input pipeline and output pipeline as required. Since a line of pixels may consist of greater than 1,000 pixels and a byte or more of data may be associated with each of these pixels, the elimination of a single line buffer results in a savings of considerable area and expense in fabricating an integrated circuit containing a bulk of the components of the video circuit of FIGS. 2a and 2b.

The image data in FIFO buffer 62 is outputted to a conventional unpacker and synchronization circuit for interfacing the local clocking of the FIFO buffer 62 with the display clock. These outputted pixel data bits are then applied to a horizontal expander and interpolator 64. The horizontal expander and interpolator 64 inserts pixel data, which may be interpolated data or duplicates of pixel data, to increase the horizontal width of the pixel image. The horizontal expander and interpolator 64 may also be any expander or decompressor suitable for the particular type of data being processed. Such an expander or decompressor may regenerate data to effectively replace the data which was eliminated by the horizontal scaler 44.

Data is outputted from the horizontal expander and interpolator 64 in accordance with a display clock and applied to a multiplexer 66. Another input to multiplexer 66 is connected to a conventional VGA graphics card for receiving the frame buffer output provided by the VGA graphics card.

At an appropriate time during the raster scanning of the display screen, the multiplexer 66 is controlled by a signal on control line 67 to pass the conventional VGA frame buffer output to the display monitor for display. When it is desired to insert the full-motion video data from buffer 54 into the data stream to be displayed, multiplexer 66 is switched to pass the output from the horizontal expander and interpolator circuit 64 to the display monitor. The multiplexer 66 is timely controlled in such a manner that the full-motion video image appears in a substantially rectangular window on the display screen. The position and size of the window on the display screen is determined by the user of the software application program being used, such as Windows™. The application program may also automatically select the size and position of the window.

The size and location of the full-motion video window on the display screen are selected and stored in a well known manner. In the preferred embodiment, the size and location of the window are identified by values stored in various registers corresponding to: the number of scan lines from the top of the screen to the beginning of the full-motion video window (i.e., the number of horizontal synchronization signals until start); a left pixel count (i.e., the number of pixels from the left of the screen to the start of the window); a right count (i.e., the number of pixels from the left of the screen to the right edge of the window); and the number of scan lines from the top of the screen to the bottom of the video window. Conventional circuitry may be used to count the horizontal sync pulses as well as the display pixel clocks to determine when to control multiplexer 66 to pass the full-motion video information only at times corresponding to the full-motion video window display times.

Additionally, in the preferred embodiment using the Windows™ program, the size and location of the full-motion video window may be programmed by the user to be represented in the VGA graphics card frame buffer as a rectangular window of a certain color (called the color-key), such as pink. Creating this solid color window is a feature of the Windows™ program. When this solid color signal outputted from the VGA frame buffer is detected by well known circuitry, multiplexer 66 may be switched to pass the full-motion video data. This provides a redundant method for determining when to control multiplexer 66 to pass either the full-motion video data or the data from the conventional VGA frame buffer. This color-key feature may also be used to cause multiplexer 66 to pass VGA graphics data (from the VGA frame buffer) when a certain color-key in the full-motion video signal is detected. This causes the VGA graphics data to appear within selected portions of the video window.

The data outputted by multiplexer 66 is converted to an analog signal by a D/A converter 68, which is then passed to the display monitor.

Full-motion video data may also be stored on a hard disk using the priority 3 decision circuitry 72, FIFO buffer 74, and the horizontal expander and interpolator 76. Such capturing on a hard disk may occur while the full-motion video data is being displayed on a display screen. Data from buffer 54 to be captured is accessed by decision circuitry 72 in substantially the same manner as previously described with respect to decision circuitry 60. However, decision circuitry 72 has the lowest priority, and access to buffer 54 will only be made if decision circuitry 60 and decision circuitry 50 have not requested access.

The line buffer 47 and vertical filter 61 can also be connected to circuit 72, using swithces 49 and 50, if the vertical expansion processing provided by circuit 72 requires the detection of a previous line of pixels temporarily stored in line buffer 47.

The operation of the FIFO buffer 74 and the horizontal expander and interpolator 76 is similar to that of the FIFO buffer 62 and the horizontal expander and interpolator 64, previously described.

In the preferred embodiment, each of the FIFO buffers 52, 62, and 74 described are part of a single cache memory whose storage addresses are allocated into three areas, each area being associated with one of the FIFO buffers described.

Optionally, the horizontal scaler 44 and horizontal expander and interpolator 64 can be automatically controlled, as described in U.S. application Ser. No. 08/136,621, but such automatic control forms no part of the present invention and is not described herein. Such automatic control of the horizontal scaler 44 ensures that the bandwidth of the video data to be stored in the buffer 54 does not exceed the bandwidth capability of the buffer 54.

The timing for the Output pipeline components in FIGS. 2a and 2b is obtained from the feature connector connected to the conventional VGA graphics card provided in a personal computer. This timing information includes the vertical synchronization, horizontal synchronization, and pixel clock.

The timing for the incoming video data portion of FIGS. 2a and 2b is obtained from the incoming video source, where decoder 40 extracts the timing information. The FIFO buffer 52 timing is obtained from the buffer 54 memory clock, and synchronization between the incoming video data and the buffer 54 memory clock is performed by a packing and synchronization circuit as described in the copending application Ser. No. 08/127,219, previously identified.

While particular embodiment of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A video processing circuit comprising:
   a vertical reduction circuit connected to receive pixel data in a raster-scan format, said pixel data corresponding to a pixel image having a vertical height, said vertical reduction circuit for reducing said vertical height of said pixel image;

a data buffer connected to an output of said vertical reduction circuit for storing said pixel data;

a vertical expansion circuit connected to an output of said data buffer for expanding said vertical height of said pixel image;

a line buffer for temporarily storing a line of pixel data; and a switching circuit connected between said line buffer, said vertical reduction circuit, and said vertical expansion circuit, said switching circuit, in a first switch mode, connecting said line buffer to said vertical reduction circuit for receiving lines of pixel data for temporary storage, said line buffer outputting said lines of pixel data to said vertical reduction circuit so that said vertical reduction circuit can detect vertically adjacent pixels in adjacent lines of pixel data for reducing said vertical height of said pixel image, said switching circuit, in a second switch mode, connecting said line buffer to said vertical expansion circuit for receiving lines of pixel data from said data buffer for temporary storage, said line buffer outputting said lines of pixel data to said vertical expansion circuit so that said vertical expansion circuit can detect vertically adjacent pixels in adjacent lines of pixel data for expanding said vertical height of said pixel image.

2. The circuit of claim 1 wherein said vertical reduction circuit comprises a vertical filter and a vertical scaler, said line buffer outputting a previous line of pixel data to a first input of said vertical filter, a second input of said vertical filter receiving a current line of pixel data so that said vertical filter can perform filtering of vertically adjacent pixels in adjacent lines of pixel data, said vertical scaler being connected to an output of said vertical filter for eliminating selected lines of pixel data outputted from said vertical filter.

3. The circuit of claim 1 wherein said vertical expansion circuit comprises an interpolator circuit for receiving a previous line of pixel data stored in said line buffer and a current line of pixel data outputted by said data buffer and generating an interpolated line of pixels for expanding said vertical height of said pixel image.

4. The circuit of claim i wherein said switching circuit is controlled to either connect said line buffer to said vertical reduction circuit or said vertical expansion circuit depending upon whether a pixel image to be displayed on a display screen is to be vertically reduced from an original pixel image applied to said video processing circuit or vertically expanded from a pixel image stored in said data buffer.

5. The circuit of claim 1 wherein said vertical expansion circuit comprises a vertical output filter for detecting vertically adjacent pixels in adjacent lines of pixel data and filtering said vertically adjacent pixels prior to said vertical expansion circuit expanding said vertical height of said pixel image.

6. The circuit of claim 1 wherein said line buffer stores a single line of pixel data.

7. The circuit of claim 1 wherein said line buffer comprises one or more shift registers.

8. The circuit of claim 1 wherein said vertical reduction circuit comprises a vertical scaler which eliminates all pixel data associated with one or more rows of pixels in said pixel image to reduce said vertical height of said pixel image.

9. The circuit of claim 1 wherein said vertical expansion circuit regenerates pixel data to maintain a desired video window size on a display screen.

* * * * *